(12) United States Patent
Davidson

(10) Patent No.: US 8,697,991 B2
(45) Date of Patent: *Apr. 15, 2014

(54) WALL PLATE DEVICES AND SYSTEMS

(75) Inventor: Gordon R. Davidson, Roy, UT (US)

(73) Assignee: Gordon R. Davidson, Roy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,694

(22) Filed: Jan. 30, 2012

(65) Prior Publication Data

US 2012/0125653 A1 May 24, 2012

Related U.S. Application Data

(63) Continuation of application No. 12/554,723, filed on Sep. 4, 2009, now Pat. No. 8,148,637.

(51) Int. Cl.
*H02G 3/14* (2006.01)

(52) U.S. Cl.
USPC .............................. 174/66; 174/53

(58) Field of Classification Search
CPC ...................................................... H02G 3/14
USPC .................... 174/53, 54, 55, 56, 62
See application file for complete search history.

(56) References Cited

U.S. PATENT DOCUMENTS

| | | | |
|---|---|---|---|
| 998,119 A * | 7/1911 | Peterson | 174/66 |
| 2,492,115 A | 12/1949 | Crowther et al. | |
| 2,740,873 A | 4/1956 | Cronk et al. | |
| 2,934,590 A | 4/1960 | Thompson et al. | |
| 3,155,808 A | 11/1964 | Wiley et al. | |
| 3,225,265 A | 12/1965 | Krause et al. | |
| 3,619,477 A * | 11/1971 | Rasmussen | 174/56 |
| 3,859,454 A * | 1/1975 | Mann | 174/66 |
| 3,987,928 A * | 10/1976 | Mori | 220/241 |
| 4,359,619 A | 11/1982 | Bergoltz | |
| 4,534,486 A * | 8/1985 | Eidson | 220/241 |
| 4,819,394 A * | 4/1989 | Compton | 52/252 |
| 4,835,343 A | 5/1989 | Graef et al. | |
| 5,653,002 A * | 8/1997 | Ishihara et al. | 24/390 |
| 6,959,954 B2 * | 11/2005 | Brandt et al. | 296/1.08 |
| 7,030,319 B2 * | 4/2006 | Johnsen et al. | 174/66 |
| 7,077,695 B2 * | 7/2006 | Kidman | 439/538 |
| 7,131,806 B2 * | 11/2006 | Hansen | 411/41 |
| 7,141,283 B2 * | 11/2006 | Janzen et al. | 428/36.9 |
| 8,148,637 B2 * | 4/2012 | Davidson | 174/66 |
| 8,261,926 B2 * | 9/2012 | Bradley et al. | 220/241 |

(Continued)

OTHER PUBLICATIONS

Leviton, Decora Plus Snap-On Wallplates, 1998, 2 pages.

(Continued)

*Primary Examiner* — Timothy Thompson
*Assistant Examiner* — Charles Pizzuto
(74) *Attorney, Agent, or Firm* — Workman Nydegger

(57) ABSTRACT

A wall plate configured to at least partially cover and/or connect to a standardized electrical box and/or components stored therein. In one implementation, the wall plate may include a substantially planar body having a front and a back. In particular, the body may be configured to at least partially cover an electrical box and/or component. In addition, the wall plate may include at least one pin extending from the back of the body in a direction substantially perpendicular to the plane of the body. The at least one pin may be positioned on the body to correspond with the location of a connector on a standardized electrical box or component.

9 Claims, 9 Drawing Sheets

(56) References Cited

U.S. PATENT DOCUMENTS

2004/0084918 A1* 5/2004 Brandt et al. ............... 296/1.08
2005/0186385 A1* 8/2005 Janzen et al. ............... 428/100
2006/0000959 A1* 1/2006 Hansen .................... 248/220.21
2007/0107174 A1* 5/2007 Bordas ........................ 24/664
2010/0176138 A1* 7/2010 Zacharevitz et al. ........ 220/737
2011/0056720 A1 3/2011 Davidson

OTHER PUBLICATIONS

USPTO, Office Action in U.S. Appl. No. 12/554,723, dated Sep. 23, 2011, 12 pages.

* cited by examiner

WALL PLATE DEVICES AND SYSTEMS

CROSS-REFERENCE TO RELATED APPLICATIONS

This patent application is a continuation application of prior U.S. patent application Ser. No. 12/554,723, filed on Sep. 4, 2009, entitled "WALL PLATE DEVICES AND SYSTEMS," the contents of the above-referenced application are hereby incorporated by reference in their entirety.

BACKGROUND

1. Technical Field

The present disclosure relates generally to building supplies. In particular, the present disclosure relates to wall plate devices and systems used to cover electrical boxes and/or components.

2. Technology

Wall plates are used in a variety of residential and commercial settings to cover electrical boxes and/or components contained therein. For example, a contractor may install a number of electrical boxes within a building during construction. Each box may contain one or more components therein, such as light switches, power receptacles, wires, and/or cables. A contractor may then use a wall plate to at least partially cover the electrical box and/or component. In particular, conventional wall plates may connect to the electrical box and/or component with one or more fasteners, such as screws. As a result, the wall plate may serve to improve the aesthetics and safety of construction. However, a variety of problems may be associated with the use of conventional wall plates.

For example, the installation, replacement, and removal of conventional wall plates may be inefficient and time consuming due to the manual labor required to screw and unscrew the fasteners holding the wall plate in place. This time consumption and inefficiency is multiplied by the fact that a single building can include dozens, if not hundreds of wall plates, each requiring at least one fastener to connect to a corresponding electrical box or component. Furthermore, if one desires to replace or upgrade wall plates within a building, he or she must first remove the old wall plates by unscrewing the old fasteners and then install new wall plates by screwing in the new fasteners, thereby compounding the burden of conventional wall plates. Although power tools may quicken this process, they do not entirely remedy the problems and inefficiencies associated with installing and/or removing wall plates using separate fasteners.

In addition to inefficiency, conventional wall plates may be unsightly. For example, conventional wall plates may be easily damaged during installation and/or removal. In particular, if a fastener is inadvertently over-tightened, it may crack the wall plate. The fasteners may also scratch the surface of wall plate during installation. Furthermore, the use of fasteners is visible on the surface of the wall plate, thereby resulting in an unsightly finished product. Magnifying this is the fact that fasteners may be painted, thereby being exposed to chipping, tarnishing, wear, and/or oxidation.

Therefore, one will appreciate that a number of problems currently exist with the use of wall plates. Although attempts have been made to remedy these problems, such attempts may require the use of additional parts and may not be operable with current standardized electrical boxes and components.

BRIEF SUMMARY

The present disclosure includes building supplies that improve the speed, efficiency, and aesthetics of the building process. In particular, the present disclosure includes wall plates configured to connect to and at least partially cover electrical boxes and/or components contained therein without the use of separate fasteners or tools. In a further implementation, the present disclosure includes wall plates configured for use with current standardized electrical boxes and components. As a result, the present disclosure allows a user to more quickly and efficiently install, remove, or replace wall plates within a building without the use of fasteners, tools, or additional devices and without modifying or replacing currently standardized electrical boxes or components contained therein. In addition, the wall plates provide a resulting product having a more uniform and aesthetically pleasing face.

In one implementation, the present disclosure includes a wall plate configured to at least partially cover an electrical box and/or components stored therein and configured to connect to the electrical box or stored components without the use of separate fasteners. In one implementation, the wall plate may comprise a substantially planar body having a front and a back. In particular, the body may be configured to at least partially cover an electrical box and/or component. In addition, the wall plate may comprise at least one pin extending from the back of the body in a direction substantially perpendicular to the plane of the body. The at least one pin may be positioned on the body to correspond with the location of a connector on an electrical box or component.

In a further implementation, the present disclosure includes a wall plate system comprising an electrical box, a component, and a wall plate. The electrical box may comprise a housing configured to connect to and/or at least partially contain the component. In particular, the housing may comprise at least one connector. The component may be configured to connect to and be at least partially disposed within the housing of the electrical box. The component may also comprise at least one connector. The wall plate may comprise a substantially planar body having a front and a back. In particular, the body may be configured to at least partially cover the electrical box and/or component. In addition, the wall plate may comprise at least one pin extending from the back of the body in a direction substantially perpendicular to the plane of the body. The at least one pin may be positioned on the body to correspond with the location of a connector of the electrical box or component.

These and other objects and features of the present disclosure will become more fully apparent from the following description and appended claims, or may be learned by the practice of the invention as set forth hereinafter.

BRIEF DESCRIPTION OF THE DRAWINGS

To further clarify the above and other advantages and features of the present disclosure, a more particular description will be rendered by reference to specific implementations thereof which are disclosed in the appended drawings. It is appreciated that these drawings depict only example implementations and are therefore not to be considered limiting of its scope. The present disclosure will be described and explained with additional specificity and detail through the use of the accompanying drawings in which.

DETAILED DESCRIPTION

The present disclosure includes building supplies that improve the speed, efficiency, and aesthetics of the building process. In particular, the present disclosure includes wall plates configured to connect to and at least partially cover electrical boxes and/or components contained therein without the use of separate fasteners or tools. In addition, the wall plates may be configured for use with current standardized electrical boxes and components. As a result, the present disclosure allows a user to more quickly and efficiently install, remove, or replace wall plates within a building without the use of fasteners, tools, or additional devices and without modifying or replacing currently standardized electrical boxes or components contained therein. Furthermore, the wall plates provide a resulting product having a more uniform and aesthetically pleasing face.

Figure 1A:
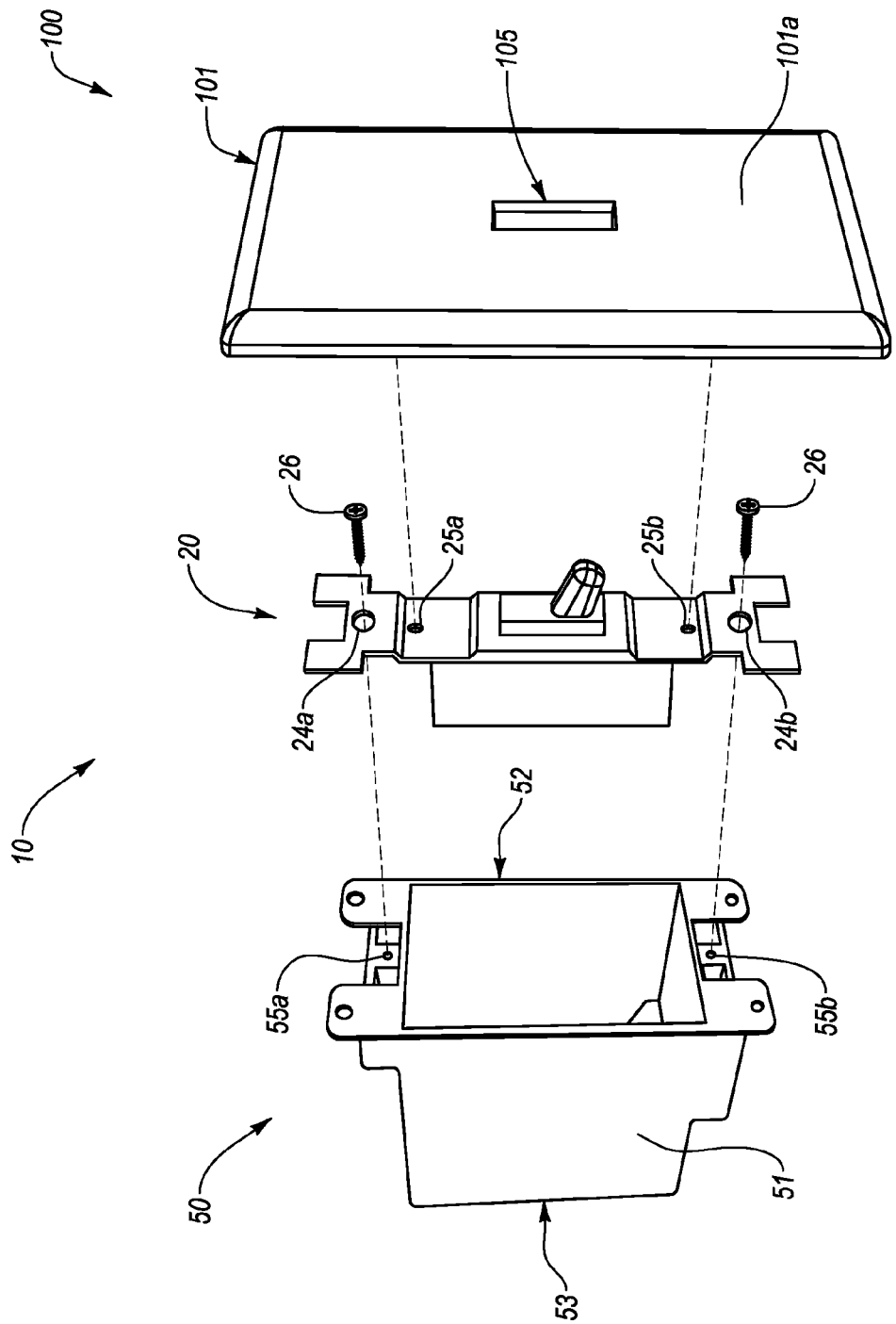
FIG. 1A discloses a perspective view of an example wall plate system in accordance with an implementation of the present disclosure.
Figure 1B:
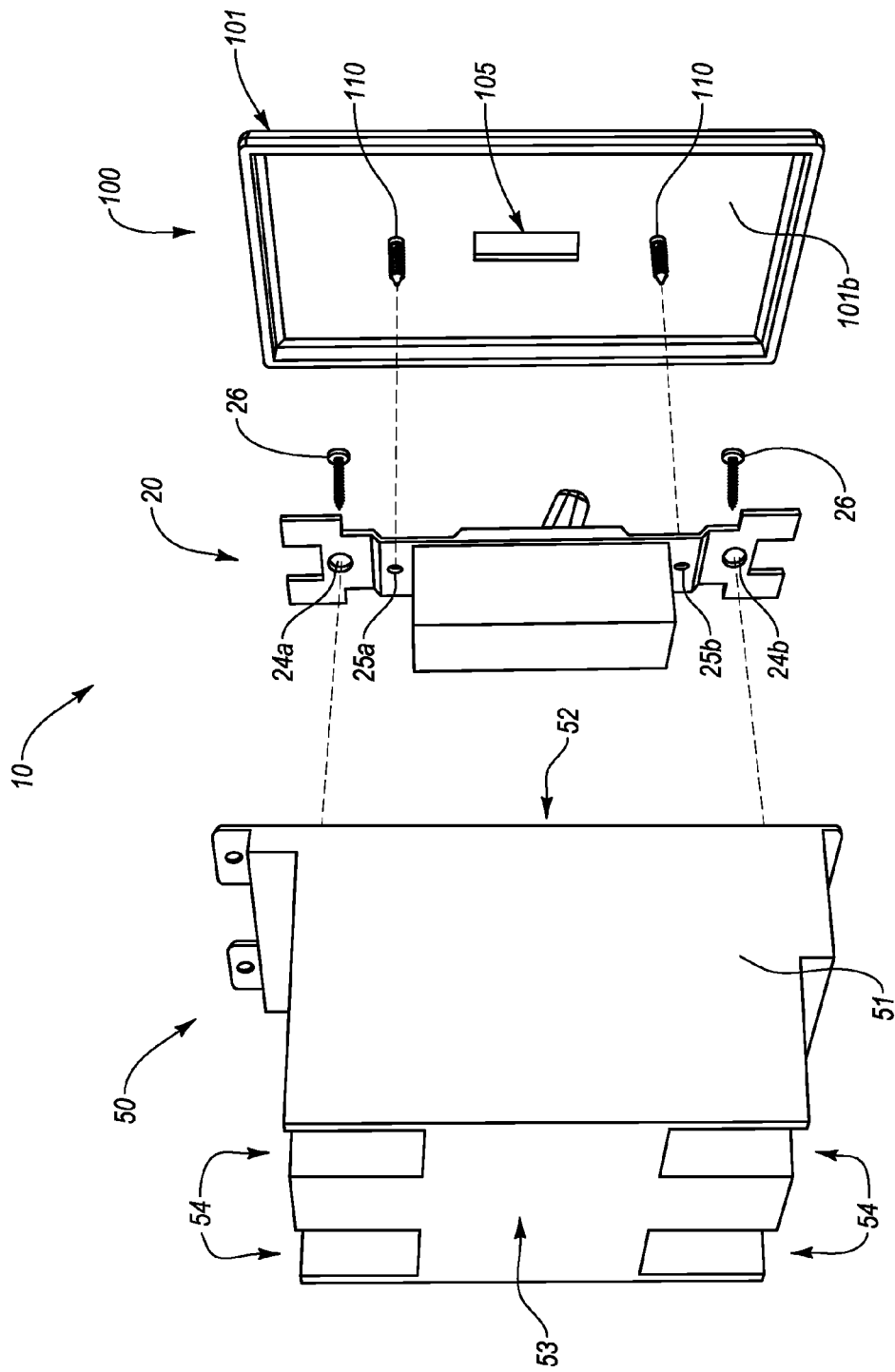
FIG. 1B discloses an alternative perspective view of the example wall plate system of FIG. 1A in accordance with an implementation of the present disclosure.

Reference is now made to FIGS. 1A and 1B, which disclose perspective views of an example wall plate system 10 in accordance with an implementation of the present disclosure. In particular, the wall plate system 10 of FIGS. 1A and 1B may include a wall plate 100, a functional device 20 (as referred to herein as a component 20), and an electrical box 50. As shown, the functional device or component 20 may connect to and be disposed within the electrical box 50. In addition, the wall plate 100 may connect to and/or at least partially cover the functional device or component 20 and/or electrical box 50.

The example electrical box 50 of the wall plate system 10 may be any electrical box, wiring box, or gang box used to at least partially contain or connect to one or more components. For example, the example electrical box 50 illustrated in FIGS. 1A-1B may be a single gang electrical box configured to house a single functional device or component 20, such as a light switch. In further implementations, the example electrical box 50 may be a multi-gang electrical box, such as a 2-gang box, 3-gang box, 4-gang box, and so on.

The electrical box 50 may include a housing 51 having an open face 52 and a closed back 53. The housing 51 may be configured to at least partially contain one or more components therein. In addition, the housing 51 may include one or more ports 54 through which one or more components may pass into the housing 51. For example, in one implementation, a first component, such as a wire, may pass through a port 54 and connect to a second component, such as a light switch, contained within the housing 51.

The electrical box 50 may also include one or more connectors 55a, 55b configured to receive and connect to fasteners used to connect a component 20 or wall plate 100 to the housing 51. For example, in one implementation, the electrical box 50 may be a single gang box and may include a first connector 55a centrally positioned proximate the top of the housing 51 and a second connector 55b centrally positioned proximate the bottom of the housing 51. The connectors 55a, 55b may be spaced and/or positioned to align with the corresponding holes 25a, 25b and/or fasteners 26 of a component 20 and/or the corresponding pins 110 of a wall plate 100 to be connected to the electrical box 50. Although the example electrical box 50 of FIGS. 1A-1B includes two connectors 55a, 55b, one will appreciate that the electrical box 50 can include any number and configuration of connectors 55a, 55b necessary to correspond with any components and/or wall plates known or used. For example, the electrical box 50 may include a single hole or may include 3 or more holes.

The connectors 55a, 55b may include features or elements configured to receive and connect to corresponding features or elements of a fastener 26 or pin 110. For example, the connectors 55a, 55b may comprise a hole having an inner diameter substantially similar, slightly larger, or slightly smaller than the outer diameter of the fastener 26 or pin 110. In addition, the connectors 55a, 55b may have internal threads or projections configured to receive the corresponding external threads or projections of the fastener 26 or pin 110.

In one implementation, the size, shape, and configuration of the electrical box 50 may be standardized. As used herein, "standardized" or "standard" may mean that a device is configured to conform to industry standards for that particular type of device. For example, the size and shape of the housing 51 and the size, shape, quantity, and position of the connectors 55a, 55b may be configured in accordance with industry standards, whether for a single-gang or multi-gang electrical box. In particular, the size and shape of the housing 51 and the size, shape, quantity, and position of the connectors 55a, 55b may configured to receive and connect to the fasteners of an industry standard component, such as a light switch or power receptacle, or a wall plate of industry standard size, shape, and/or configuration.

As mentioned, the example wall plate system 10 may also include a functional device or component 20. In particular, the functional device or component 20 can be any of a variety of different functional device or components used in residential and/or commercial construction. For example, the functional device or component 20 may be a light switch, such as a toggle light switch, rocker switch, push button switch, dimmer switch, other similar switches, and/or combinations of the same. In further implementations, the functional device or component 20 may be a power receptacle (also referred to herein as an power outlet), a phone jack, data jack, a coaxial cable such as a CATV cable, speaker wire, electrical wire, component video or audio cables, HDMI cables, other similar wires, cables, or devices, and/or combinations of the same.

The functional device or component 20 may also be configured to connect to the electrical box 50. For example, the functional device or component 20 may include one or more holes 24a, 24b and/or fasteners 26 for connecting the component 20 to the electrical box 50. In particular, the functional device or component 20 may include a first hole 24a centrally positioned proximate the top of the functional device or component 20 and a second hole 24b centrally positioned proximate the bottom of the functional device or component 20.

The holes 24a, 24b may be spaced and positioned to align with the corresponding connectors 55a, 55b of the electrical box 50.

The functional device or component 20 may also be configured to connect to the wall plate 100. For example, the component 20 may include one or more connectors 25a, 25b configured to receive and connect to the pins 110 of the wall plate 100. The connectors 25a, 25b may include features or elements configured to receive and connect to corresponding features or elements of a fastener 26 or pin 110. For example, the connectors 25a, 25b may comprise a hole having an inner diameter substantially similar albeit slightly larger than the outer diameter of the fastener 26 or pin 110. In addition, the connectors 25a, 25b may have internal threads or projections configured to receive the corresponding external threads or projections of the fastener 26 or pin 110.

Although the example functional device or component 20 includes two holes 24a, 24b and two connectors 25a, 25b, one will appreciate that the functional device or component 20 may include any number and configuration of holes 24a, 24b and connectors 25a, 25b necessary to correspond with electrical boxes and/or wall plates of different configurations. For example, in further implementations, the functional device or component 20 may include 1 or fewer holes 24a, 24b or 3 or more holes 24a, 24b. In addition, the functional device or component 20 may include 1 or fewer connectors 25a, 25b or 3 or more connectors 25a, 25b. In a yet further embodiment, the functional device or component 20 may not include any holes 24a, 24b, such as with a coaxial cable, phone cable, or speaker wire.

In a further implementation, the functional device or component 20 may be standardized. For example, the size, shape, and configuration of the functional device or component 20 and the size, shape, quantity, position, and configuration of the holes 24a, 24b and connectors 25a, 25b may be in accordance with industry standards for a particular type of component. In particular, the functional device or component 20 may be configured to connect to an industry standard electrical box and/or wall plate of industry standard size, shape, and configuration.

In addition to the functional device or component 20, the example wall plate system 10 may include a wall plate 100. As used herein, the term "wall plate" shall mean any wall plate, electrical cover, outlet covers, light switch plates, and/or any other plate or cover configured to at least partially cover an electrical box, component box, wall opening, and/or corresponding wiring or components. The wall plate 100 may be configured to connect to and/or interface with the electrical box 50 and/or component 20. In particular the wall plate 100 may include a substantially planar body 101 having a front 101a and a back 101b. The body 101 may be of any size, shape, and configuration desired for a particular application.

In one implementation, the body 101 may have an outer edge configured to interface with the electrical box 50 or a surrounding surface, such as a wall. For example, the body 101 may have an outer edge that curves backwards and is configured to abut a surface surrounding an installed electrical box 50, such as a wall.

In one implementation, the front 101a of the body 101 may have a substantially smooth surface. For example, the front 101a of the body 101 may have no or a limited number of holes or projections along the surface thereof. As a result, the front 101a may provide a uniform and aesthetically pleasing finished surface once installed.

The back 101b of the body 101 may have one or more elements extending from the back 101b configured to interface with and connect to an electrical box 50 and/or component 20. For example, the body 101 may include one or more pins 110 extending from the back 101b. The pins 110 may extend in a direction substantially perpendicular to the plane defined by the body 101. The pins 110 may be positioned to correspond with the positions of the connectors 25a, 25b in the component 20. The size and length of the pins 110 may also be configured to extend into and interface with the connectors 25a, 25b of the component 20. In a further implementation, the pins 110 may be positioned and configured to directly interface with and insert into the connectors 55a, 55b of the electrical box 50.

In one implementation, the pins 110 may comprise an elongated and substantially cylindrical shaft. The outside diameter of the shaft of the pin 110 may be substantially similar to the inner diameter of the connectors 25a, 25b of the component 20 or the connectors 55a, 55b of the electrical box 50. The pins 110 may also be configured to connect to the connectors 25a, 25b, 55a, 55b by at least partially resisting movement and/or removal once they have inserted into the connectors 25 a, 25b, 55a, 55b. In addition, the length, shape, and outer diameter of the pin 110 may be configured to provide the desired connection with a connector 25a, 25b, 55a, 55b.

In a further implementation, a pin 110 may have one or more projections (i.e., 411a, 411b, FIG. 4A) extending from a surface thereof. The projections may be configured to apply force or friction to the inner surface or other elements or features of the connectors 25a, 25b, 55a, 55b thereby resisting movement between the pin 110 and a connector 25a, 25b, 55a, 55b into which the pin 110 is inserted. As a result, the wall plate 100 may be connected to a component 20 or electrical box 50 by inserting the pins 110 into the connectors 25a, 25b, 55a, 55b without the need for separate fasteners, such as screws.

As mentioned above, the connectors 25a, 25b, 55a, 55b of the component 20 and/or electrical box 50 may have internal threads configured to receive a fastener, such as a screw. Accordingly, the pin 110 may include one or more projections configured to interface with the internal threads of the connectors 25a, 25b, 55a, 55b of the component 20 or electrical box 50 in order to resist relative movement between the pins 110 and the connectors 25a, 25b, 55a, 55b, thereby resisting movement of the wall plate 100 once installed. For example, the projections may include flanges, barbs, teeth, threads, ridges, bumps, other similar features, and/or combinations of the same extending from a surface thereof. In one implementation, one or more projections may be disposed at localized positions on the pin 110. In a further implementation, one or more projections may extend annularly around the pin 110.

Figure 5A:
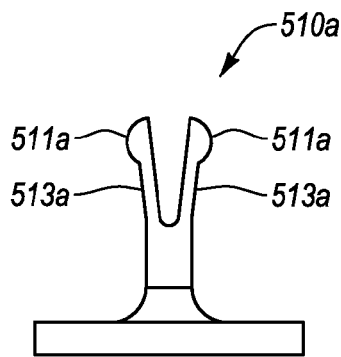
FIGS. 5A-5O disclose additional example pins in accordance with implementations of the present disclosure.

In a further implementation, the pin 110 may be split along the length thereof, thereby defining a plurality of prongs (i.e., 513a, FIG. 5A). For example, the pin 110 may include a single longitudinal slot defining a pair of prongs, with one prong on each side of the slot. In a further implementation, the pin 110 may include a plurality of slots and a greater number of prongs. For example, the pin 110 may include three, four, five, or more prongs, with corresponding slots therebetween.

In a further implementation, the prongs may also be configured to elastically flex inward from a first position as the pin 110 is inserted into a connector and then return toward the first position after the prongs pass through the connector. Accordingly, the elastic flex of the prongs may facilitate the insertion of the pins 110 into the connectors and the resistance to movement once the pin 110 is inserted.

In one implementation, each prong may extend in generally the same direction, being substantially parallel with a longitudinal axis of the pin 110. In a further implementation, one or more prongs may extend in a direction angled away from the longitudinal axis of the pin 110. The angled configuration of the prongs may assist in resisting removal of the pin 110 from a connector once the pin 110 is inserted. In a further implementation, each prong may include one or more projections extending from a surface thereof.

In a further implementation, the body 101 of the wall plate 100 may include one or more apertures 105 configured to provide access to the component 20 or electrical box 50. The one or more apertures 105 may have any shape and configuration necessary to correspond with a particular component or components. For example, the one or more apertures 105 can be substantially rectangular, circular, polygonal, octagonal, square, oval, other similar shapes, and/or combinations of the same. In one implementation, the wall plate 100 may include an aperture 105 configured in shape and position to provide access to a light switch, such as a toggle switch, in order to allow a user to operate the light switch. In a further implementation, the wall plate 100 may include one or more apertures 105 configured to provide access to a power receptacle and/or other component.

In one implementation the pins 110 may be integral with the body 101 of the wall plate 100. As used herein, "integral with" may mean that the pins 110 are formed as one structure with the body 101. For example, the pins 110 may be molded together with the body 100. In a further implementation, the pins 110 may be formed separately and then coupled to the body 101 of the wall plate 100 prior to or after distribution. In particular, the back 101a of the body 101 may include one or more grooves (i.e., 302, FIGS. 3A-3B) configured to receive the separately manufactured pins 110. As used herein, the term "groove" may include any recess, cavity, channel, niche, notch, void, depression, opening, slot, and/or other similar elements.

The pins 110 and/or body 101 of the wall plate 100 may include any of a number of different materials. In one implementation, the body 101 and/or pin 110 may be formed using one or more plastic materials or elastomeric materials. In further implementations, the body 101 and/or pins 110 may be formed using metals, polymers, polyethylene, polypropylene, PVC, rubber, other similar materials, and/or combinations of the same. In a yet further implementation, the materials used for the pins 110 may be different than the materials used for the body 101. The materials used for the pins 110 and/or body 101 may be rigid, semi-rigid, or flexible.

The wall plate 100 may be configured to correspond with the size and/or shape of a standardized electrical box and/or the size and/or shape of standardized components. In further implementations, however, the size and/or shape of the wall plate 100 may be configured to correspond with any desired size and shape. Although the wall plate 100 is shown having a single aperture 105, the number, size and/or shape of the apertures 105 may be modified to correspond with any desired configuration. For example, the wall plate 100 may be configured to operate in conjunction with multiple components 20 and/or a multi-gang electrical box 50. In particular, the wall plate 100 may include apertures 105 configured to operate in conjunction with any number or combination of toggle light switches, rocker light switches, power receptacles, phone jacks, CATV cables, speaker wiring, and/or other similar components.

In addition, the color of the wall plate 100 may vary as desired for a particular configuration. In particular the wall plate 100 may include any color desired to correspond with paint colors, trim colors, component colors, and/or other colors used or desired in a building where the wall plate 100 is going to be installed. In a further implementation, the wall plate 100 may include a light source, such as glow-in-the-dark materials, LEDs, and/or other similar light sources.

As shown in FIGS. 1A-1B, the wall plate 100 may include two pins 110. However, in further implementations, the wall plate 100 may include less or more pins 110 as necessary to be connected to a component 20 and/or electrical box 50. For example, the wall plate 100 may include as few as one pin 110 and as many as ten or more pins 110. The pins 110 may be configured to insert into a connector 25a, 25b of the component 20 itself or, in a further implementation, may be configured and positioned to insert directly into a connector 55a, 55b of the electrical box 50. The pins 110 may be configured to resist inadvertent movement between the plate and the component 20 or electrical box 50 but may also be configured to allow sufficient relative movement for installation, removal, and reinstallation of the wall plate 100.

Figure 2A:
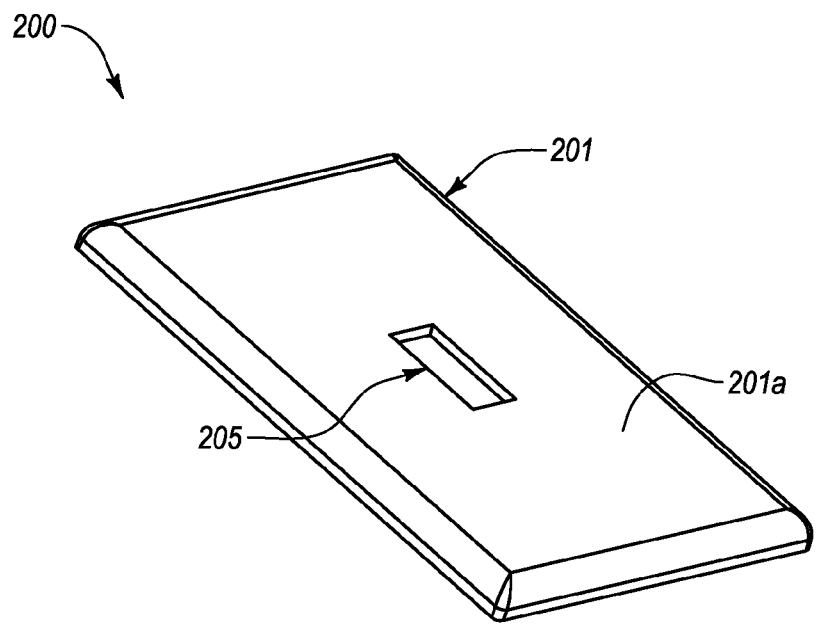
FIG. 2A discloses a perspective view of an example wall plate in accordance with an implementation of the present disclosure.
Figure 2B:
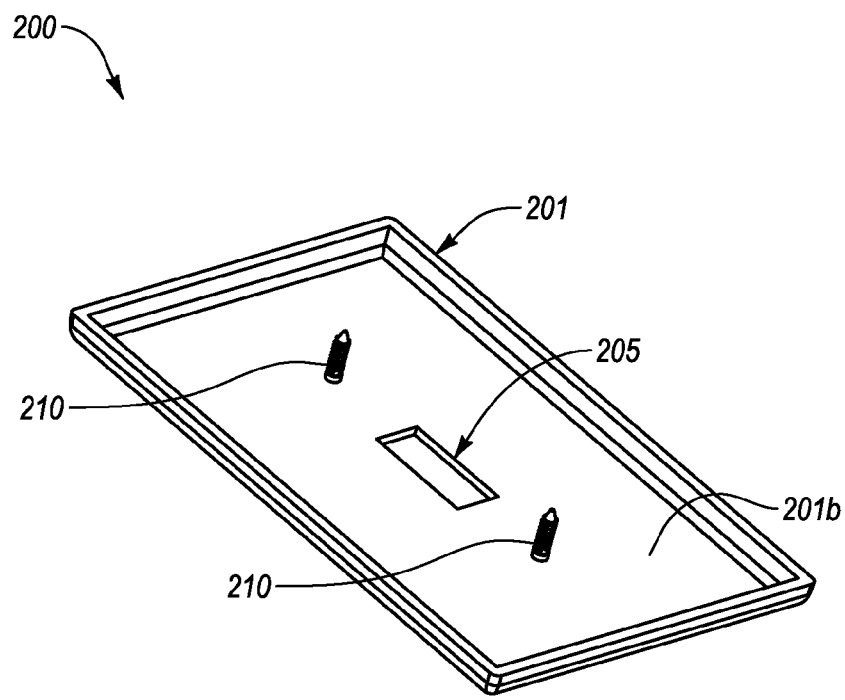
FIG. 2B discloses an alternative perspective view of the example wall plate of FIG. 2A in accordance with an implementation of the present disclosure.

Reference is now made to FIGS. 2A-2B, which disclose a further example wall plate 200 in accordance with the present disclosure. The wall plate 200 of FIGS. 2A-2B may be similar to the example wall plate 100 previously described above and shown in FIGS. 1A-1B in most respects. Like structures and/or components may be given like reference numerals.

In particular, FIGS. 2A and 2B disclose a wall plate 200 having pins 210 formed as an integral part of the wall plate 200. As shown, the wall plate 200 may include a substantially planar body 201 with a smooth front 201a and one or more pins 210 extending from its back 201b. The body 201 may also include one or more apertures 205 configured to provide access to a component (i.e., 20, FIGS. 1A-1B).

As shown, the pins 210 may be formed as an integral part of the body 201 of the wall plate 200. In one implementation, the pins 210 may include reinforcement providing strength to the pins 210 themselves. In a further implementation, the reinforcement of the pins 210 may extend into the body 201 thereby reinforcing the connection between the pins 210 and the body 201. In one example, the reinforcement may include wire, mesh, fibers, other similar reinforcement elements, and/or combinations of the same.

Figure 3A:
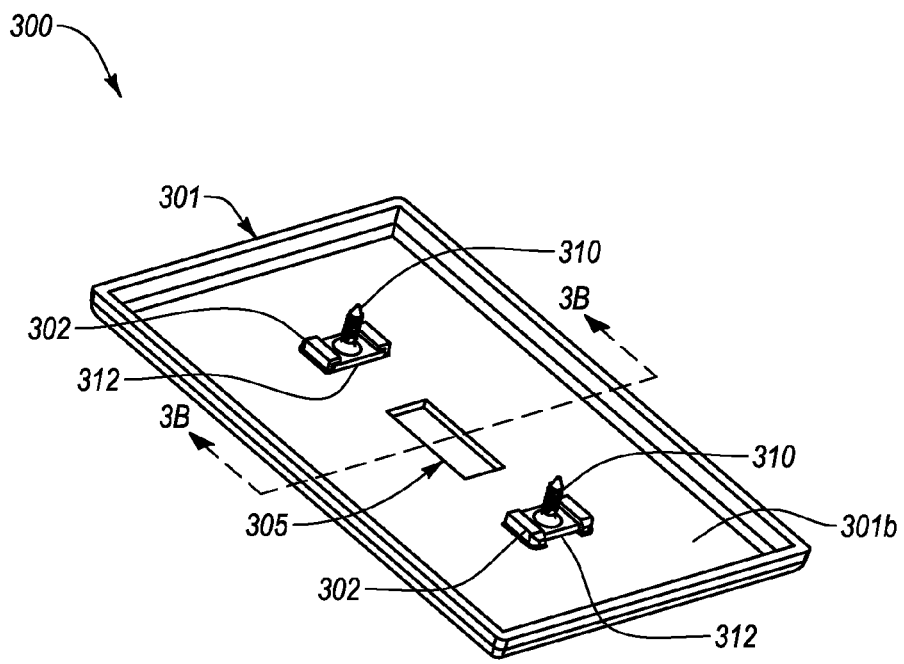
FIG. 3A discloses a further example wall plate in accordance with an implementation of the present disclosure.
Figure 3B:
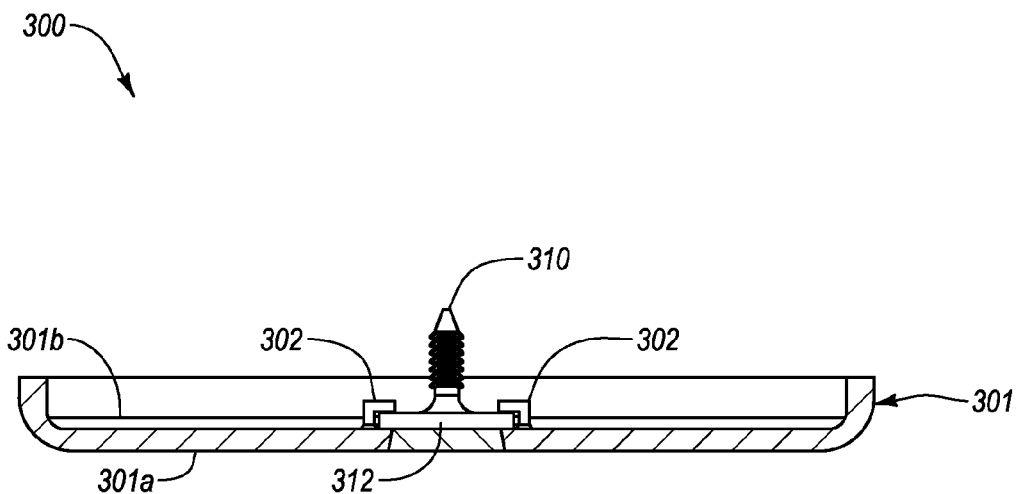
FIG. 3B discloses a cross-sectional view of the example wall plate of FIG. 3A along the line 3B-3B.

Reference is now made to FIGS. 3A-3B, which disclose an additional example wall plate 300 in accordance with an implementation of the present disclosure. The wall plate 300 of FIGS. 3A-3B may be similar to the example wall plates 100, 200 previously described above and shown in FIGS. 1-2 in most respects. Like structures and/or components may be given like reference numerals.

In particular, the wall plate 300 of FIGS. 3A-3B may include a substantially planar body 301 and a plurality of pins 310 coupled thereto. For example, the body 301 may include a front surface 301a, a back surface 301b, and one or more grooves 302 on the back surface 301b that are configured to receive, support, and/or hold a pin 310. In addition, each pin 310 may include a base portion 312 configured to insert into and be secured by the grooves 302 of the body 301. Once received into the one or more grooves 302, the pin 310 may be temporarily or permanently coupled to the body 301 of the wall plate 300. For example, the pin 310 may be attached to the body 301 using adhesives, clips, welding, friction, other similar devices, and/or combinations of the same. The wall plate 300 may also include an opening 305 to provide access to a functional device, such as a conventional light switch.

FIG. 3B illustrates a cross sectional view of the wall plate 300 of FIG. 3A along the line 3B-3B. As shown, in one implementation, the height, width and length of the base portion 312 of the pin 310 may be configured to correspond with the size, shape and separation of the grooves 302 of the body 301. Although the wall plate 300 is shown in FIGS. 3A-3B having a pair of grooves 302 for each pin 310, in a further implementation, the wall plate 300 may include a single groove 302 for each pin 310. Furthermore, although the grooves 302 of FIG. 3A-3B are elongated in shape, in further implementations, the size and/or shape of the grooves 302 may be altered to correspond with any desired configuration. In one example, the wall plate 300 may include a single U-shaped groove configured to receive and retain the base portion 312 of a pin 310.

Figure 4A:
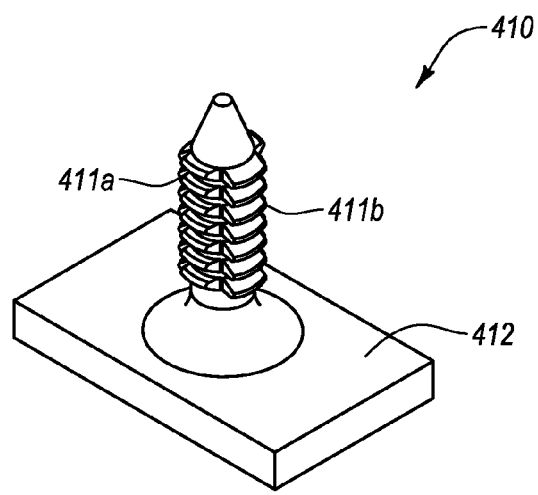
FIGS. 4A-4C disclose an example wall plate pin in accordance with implementations of the present disclosure.
Figure 4B:
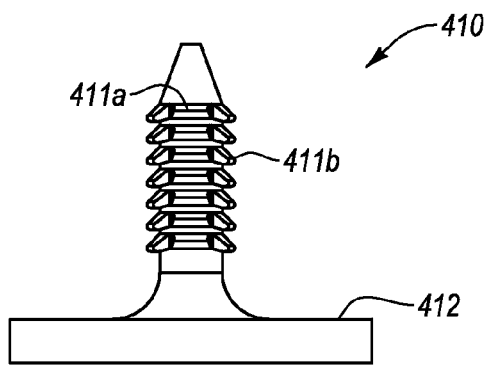
Figure 4C:
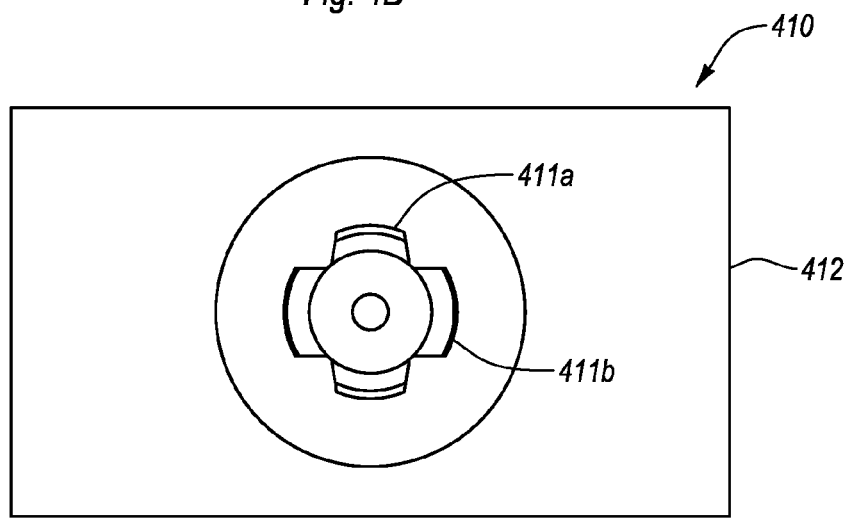

Reference is now made to FIGS. 4A-4C, which illustrate an example pin 410 in accordance with an implementation of the present disclosure. In particular, FIG. 4A discloses a perspective view of the example pin 410, FIG. 4B illustrates a side view of the pin 410, and FIG. 4C illustrates a top view of the pin 410. The pin 410 of FIGS. 4A-4C may be similar to the example pins 110, 210, 310 previously described above and shown in FIGS. 1-3 in most respects. Like structures and/or components may be given like reference numerals.

As shown, the pin 410 may be elongated and substantially cylindrical in shape with a beveled head. The pin 410 may include a plurality of projections 411a, 411b extending from a lateral surface or surfaces thereof. In particular, the pin 410 may include a plurality of upwardly angled, tooth-like projections 411a and a plurality of downwardly angled, tooth-like projections 411b. The pin 410 may also include a base portion 412 configured to insert into and be retained within one or more grooves (i.e., 302, FIGS. 3A-3B).

The projections 411a, 411b may be configured to provide resistance to movement between the pin 410 and a component or electrical box once inserted into the connector (i.e., 25, 55, FIGS. 1A-1B) of an electrical box or component. The pin 410 and/or projections 411a, 411b may also be configured to allow sufficient movement for the pin 410 to be removed and reinserted as desired in order to uninstall and/or reinstall a corresponding wall plate. The shape, contour, angle, and position of the pin 410 and the projections 411a, 411b may be selected to provide a desired securement, movement resistance, ease of installation, ease of removal, and/or other desired characteristics.

Figure 5B:
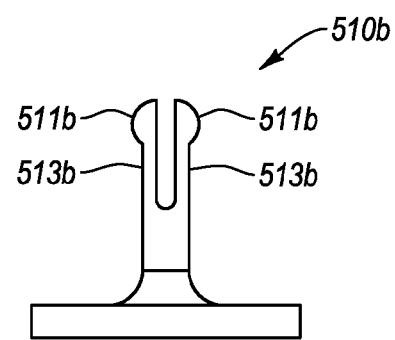
Figure 5C:
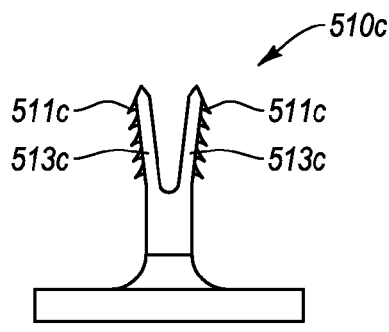
Figure 5D:
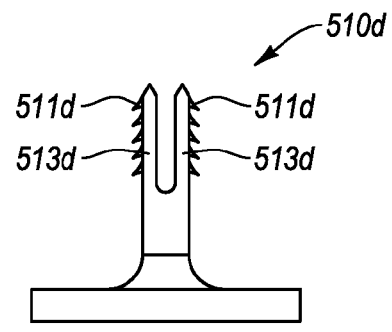
Figure 5E:
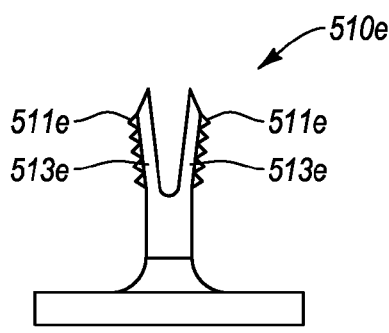
Figure 5F:
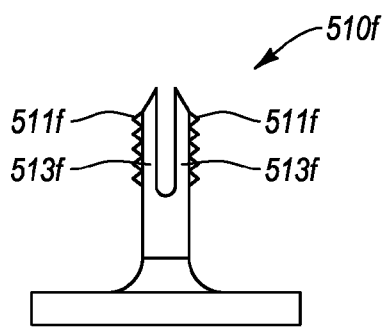
Figure 5G:
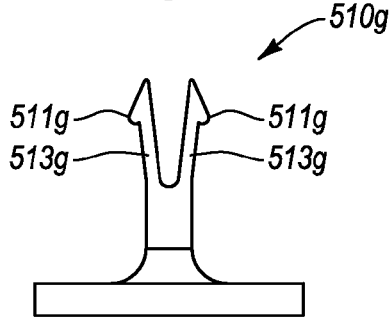
Figure 5H:
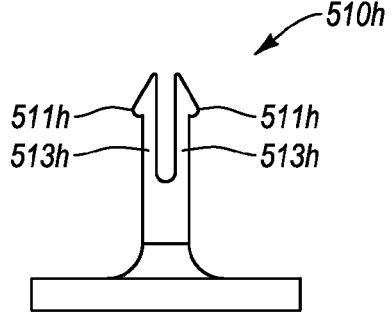
Figure 5I:
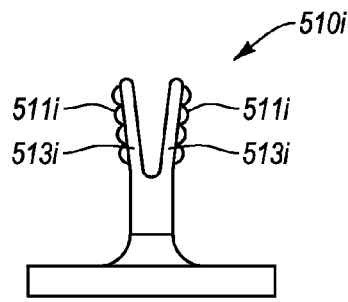
Figure 5J:
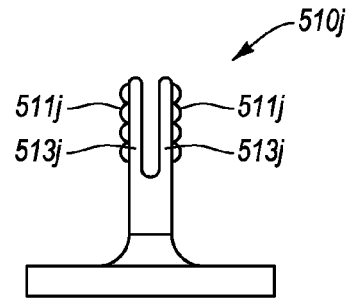
Figure 5K:
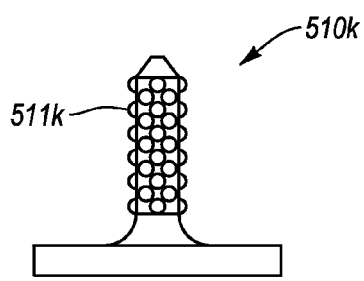
Figure 5L:
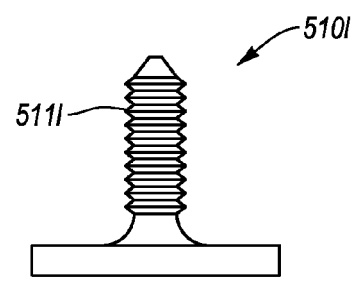
Figure 5M:
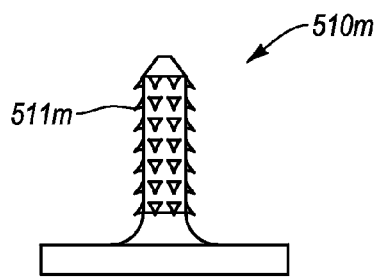
Figure 5N:
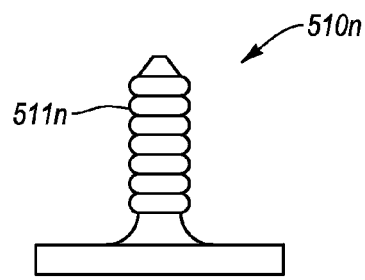
Figure 5O:
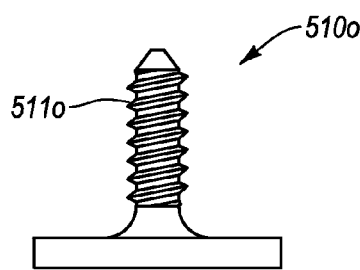

Reference is now made to FIGS. 5A-5O, which illustrate further example pins 510 in accordance with implementations of the present disclosure. The pins 510 of FIGS. 5A-5O may be similar to the example pins 110, 210, 310, 410 previously described above and shown in FIGS. 1-4 in most respects. Like structures and/or components may be given like reference numerals.

For example, FIGS. 5A and 5B illustrate an example of a bifurcated pin 510a, 510b. In one implementation, the example bifurcated pin 510a, 510b may have projections 511a, 511b extending from a surface thereof proximate the head of the pin 510a, 510b thereby providing an enlarged head relative to another portion of the pin 510a, 510b. In a further implementation, the example bifurcated pin may have a plurality of prongs 513a, 513b. The prongs 513a may be angled away from the longitudinal axis of the pin 510a, as shown in FIG. 5A, or the prongs may be substantially parallel with the longitudinal axis of the pin 510b, as shown in FIG. 5B.

FIGS. 5C and 5D illustrate a further example bifurcated pin 510c, 510d having a plurality of prongs 513c, 513d. In one implementation, each prong 513c, 513d may include one or more barb- or flange-like projections 511c, 511d disposed along the length thereof. In a further implementation, each prong 513c, 513d may have a pointed or beveled head. The prongs 513c may be angled away from the longitudinal axis of the pin 510c, as shown in FIG. 5C, or the prongs 513d may be substantially parallel with the longitudinal axis of the pin 510d, as shown in FIG. 5D.

FIGS. 5E and 5F illustrate another example bifurcated pin 510e, 510f having a plurality of prongs 513e, 513f. In one implementation, each prong 513e, 513f of the bifurcated pin 510e, 510f may have a plurality of tooth-like or angular projections 511e, 511f disposed along the length thereof. In a further implementation, each prong 513e, 513f may have a pointed or beveled head. The prongs 513e may be angled away from the longitudinal axis of the pin 510e, as shown in FIG. 5E, or the prongs 513f may be substantially parallel with the longitudinal axis of the pin 510f, as shown in FIG. 5F.

FIGS. 5G and 5H illustrate a yet further example bifurcated pin 510g, 510h having a plurality of prongs 513g, 513h. In addition, the pin 510g, 510h may have a beveled head and corresponding ridge-like projections 511g, 511h disposed proximate the head and extending at least partially around the prongs 513g, 513h. The prongs 513g may be angled away from the longitudinal axis of the pin 510g, as shown in FIG. 5G, or the prongs 513h may be substantially parallel with the longitudinal axis of the pin 510h, as shown in FIG. 5H.

FIGS. 5I and 5J illustrate an additional example bifurcated pin 510i, 510j having a plurality of prongs 513i, 513j. In one implementation, the pin 510i, 510j may have a plurality of rounded projections 511i, 511j, such as rounded teeth, bumps, or ridges, disposed along the length thereof. The prongs 513i may be angled away from the longitudinal axis of the pin 510i, as shown in FIG. 5I, or the prongs 513j may be substantially parallel with the longitudinal axis of the pin 510j, as shown in FIG. 5J.

FIGS. 5K-5O illustrate example pins that are not bifurcated. For example, FIG. 5K illustrates an example pin 510k having a plurality of bump-like or hemispherical projections 511k disposed along the length thereof. FIG. 5L illustrates a further example pin 510l having a plurality of angular, ridge-like projections 511l extending around and along the length thereof. FIG. 5M illustrates an additional example pin 510m having a plurality of barb-like projections 511m disposed around and along the length of the pin 510m. FIG. 5N illustrates a yet further example pin 510n having a plurality of rounded, ridge-like projections 511n extending around and along the length thereof. FIG. 5O illustrates another example pin 510o having threaded projections 511o extending helically around and along the length of the pin 510o.

The teachings of the present disclosure may be extended to any configuration of wall plate known in the art. For example, reference is now made to FIGS. 6-8 which disclosure further example wall plates 600, 700, 800 in accordance with implementations of the present disclosure. The wall plates 600, 700, 800 of these configurations may be similar to the wall plates 100, 200, 300 disclosed in FIGS. 1-3 and described in more detail above in most respects, wherein certain features will not be described in relation to these configurations wherein those components may function in the manner as described above and are hereby incorporated into these additional configurations described herein. Like structures and/or components may be given like reference numerals.

Figure 6:
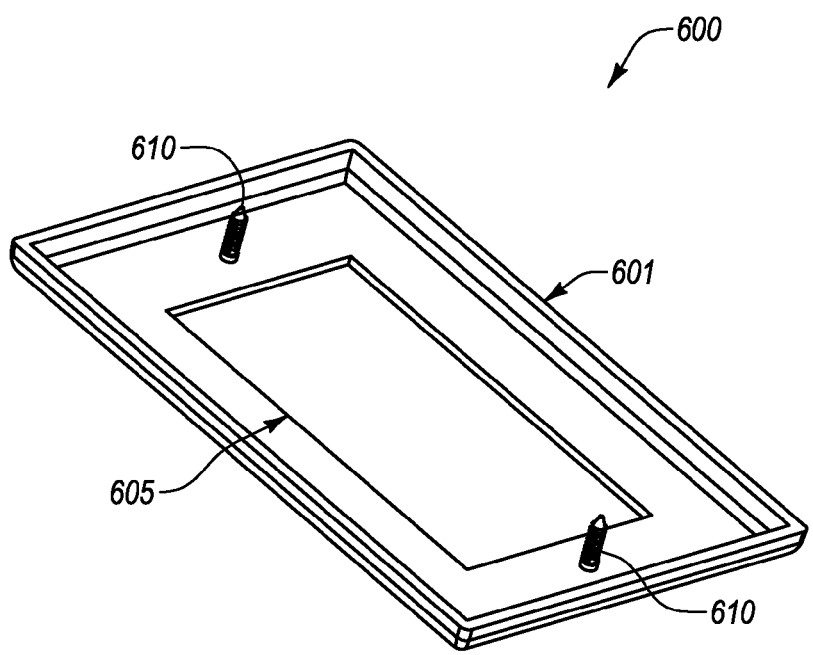
FIG. 6 discloses a yet further example wall plate in accordance with implementations of the present disclosure.
Figure 7:
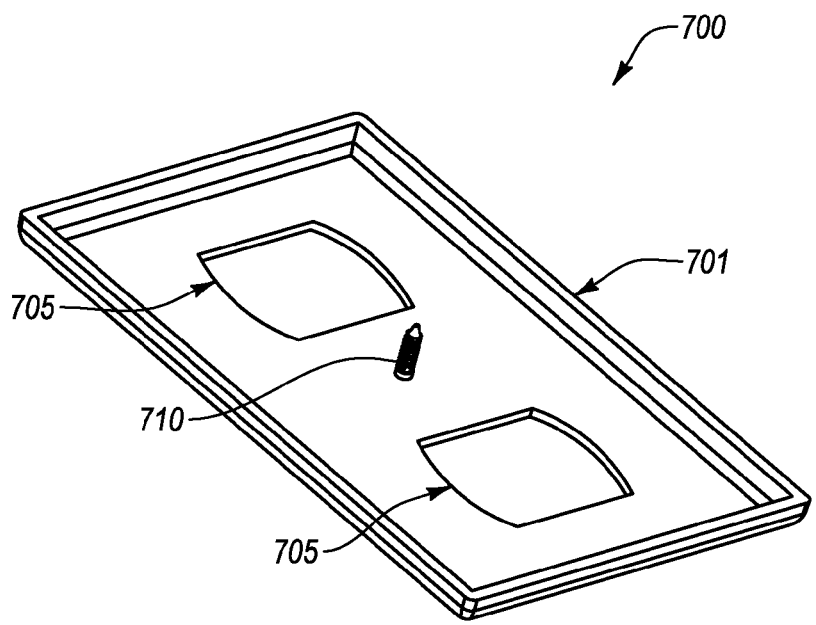
FIG. 7 discloses an additional example wall plate in accordance with implementations of the present disclosure.
Figure 8:
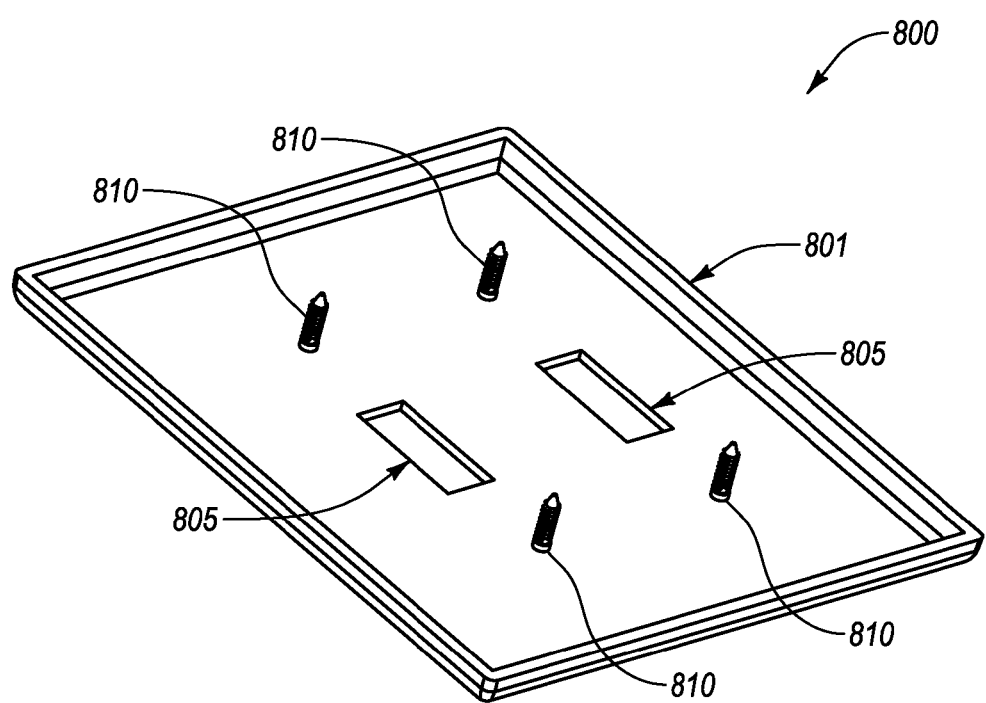
FIG. 8 discloses an example multi-gang wall plate in accordance with implementations of the present disclosure.

In particular, FIG. 6 illustrates a wall plate 600 having a body 601, an aperture 605, and pins 610 configured to correspond with and connect to a rocker light switch component. FIG. 7 illustrates an example wall plate 700 having a body 701, a plurality of apertures 705, and a single pin 710 configured to correspond with and connect to a standard power receptacle component. FIG. 8 discloses one example of a multi-gang wall plate 800. In particular, the wall plate 800 may include a body 801, a plurality of apertures 805 and a plurality of pins 810 configured to interface with and connect to a plurality of toggle light switches.

Implementations of the present disclosure may be embodied in other specific forms without departing from the spirit or essential characteristics of the present disclosure. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A wall plate system comprising:
an electrical box;
at least one functional device configured to fasten to the electrical box;
at least one threaded screw hole disposed on the at least one functional device and configured to accept screws; and
a wall plate configured to be secured to the functional device, wherein:
the wall plate having a planar front surface and a planar back surface, the wall plate being configured to at least partially cover one or more of the electrical box and the functional device, and
the wall plate has at least one pin extending from the back surface, the at least one pin being sized and configured to be received within the at least one threaded screw hole of the functional device;
the at least one pin has a plurality of flexible projections extending outward from a longitudinal axis thereof,
at least two flexible projections of the plurality of flexible projections are longitudinally spaced along the longitudinal axis from each other, and
the plurality of flexible projections are configured to interface with internal threads of at least one threaded screw hole and resist relative movement between the at least one pin and the threaded screw hole; and
wherein the plurality of flexible projections comprise:
projections angled toward the back surface of the wall plate; and
projections angled away from the back surface of the wall plate.

2. The wall plate system as recited in claim 1, wherein the functional device comprises one or more of a switch and an outlet.

3. The wall plate system as recited in claim 1, further comprising one or more apertures extending through the wall plate, the one or more apertures being configured to provide access to the functional device.

4. The wall plate system as recited in claim 1, wherein the at least one pin is integral with the wall plate.

5. A wall plate configured to connect to a standardized electrical box or a functional device, the wall plate comprising:
a body having a planar front surface and a planar back surface;
at least one pin extending from the back surface of the body; and
a plurality of flexible projections disposed along the at least one pin,
wherein:
the plurality of flexible projections extend annularly around at least a portion of the at least one pin,
the plurality of flexible projections comprise projections angled toward the back surface of the wall plate and projections angled away from the back surface of the wall plate, and
the plurality of flexible projections are sized and configured to interface with internal threads of a threaded screw hole on the standardized electrical box or the functional device and resist relative movement between said at least one pin and the threaded screw hole.

6. The wall plate as recited in claim 5, wherein the plurality of flexible projections extend annularly around only a portion of the at least one pin.

7. The wall plate as recited in claim 6, wherein:
the plurality of flexible projections comprise rows of projections longitudinally spaced along a length of the at least one pin; and
each row of projections includes at least one projection angled toward the back surface of the wall plate and at least one projection angled away from the back surface of the wall plate.

8. The wall plate as recited in claim 7, wherein the at least one pin is integral with the wall plate.

9. The wall plate as recited in claim 8, wherein the plurality of flexible projections comprise tooth-like projections.

* * * * *